July 19, 1966 H. A. Y. TOURNIER 3,261,432
DISC BRAKE APPARATUS
Filed July 13, 1964 4 Sheets-Sheet 1

INVENTOR
HENRI A. Y. TOURNIER
By Irwin S. Thompson
ATTY.

July 19, 1966 H. A. Y. TOURNIER 3,261,432
DISC BRAKE APPARATUS

Filed July 13, 1964 4 Sheets-Sheet 2

INVENTOR
HENRI A. Y. TOURNIER
By Irving S. Thompson
ATTY.

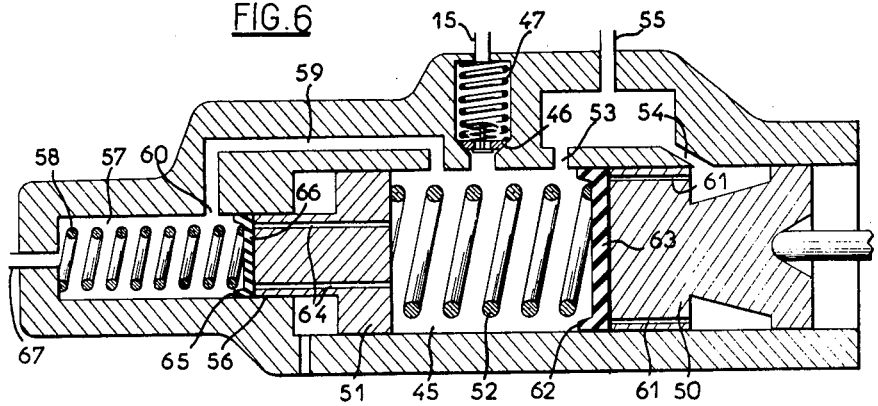
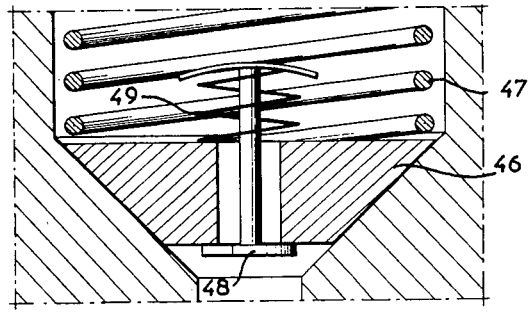
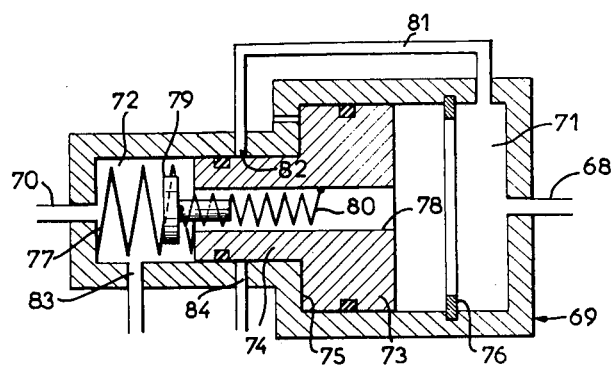
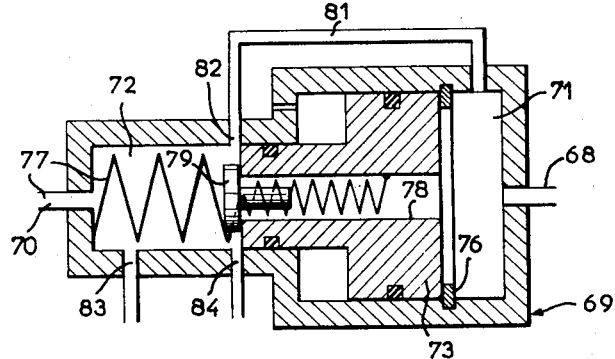

United States Patent Office 3,261,432
Patented July 19, 1966

3,261,432
DISC BRAKE APPARATUS
Henri André Yves Tournier, Beauchamp, France, assignor to Societe Anonyme Francaise du Ferodo, Paris, France, a corporation of France
Filed July 13, 1964, Ser. No. 382,147
Claims priority, application France, July 18, 1963, 941,849, Patent 1,370,811
1 Claim. (Cl. 188—140)

In disc or like brakes for vehicles for example, the force applied to clamp the disc between two shoes or pads in a direction at right angles to the friction surfaces is controlled directly by the user, and the resulting couple is subject to variations of the coefficient of friction. This may result in variations in the deceleration obtained for a given force applied on the brake pedal of a vehicle, entailing variations in the distances in which the vehicle is brought to a halt, due to such factors as fading, "morning chill," etc., which may or may not be accompanied by a state of unbalance between the braking forces on the front and rear axles of the vehicle, or between the off-side and near-side of one axle of the vehicle, leading to an unbalance of the steering of the vehicle. Although of lesser magnitude than those observed in conventional drum-type brakes, these shortcomings are not thereby less incompatible with the maximum safety of a vehicle, especially at high speed. This represents a serious drawback of disc brakes, whose behaviour when heated is excellent however. In addition, when one or more wheel loses adhesion, an automobile vehicle equipped with standard disc brakes is liable, in the same way as with any conventional braking mechanism, to lose its directional powers, or to begin a spinning motion spontaneously.

The main object of the present invention is to provide improved disc brakes and the like in which these shortcomings are minimised or eliminated by a simple construction.

According to the present invention a disc brake apparatus comprises a disc like element to be fast with a rotatable member to be braked, a pair of brake shoes movably mounted in a frame on opposite sides of said element and having friction surfaces engageable with said element, actuating means operable by the user to apply a force to said shoes in a direction normal to said surfaces to cause said shoes to grip the rotatable member between them, and modifying means, responsive to a force engendered by the shoes being moved by the rotating member in the direction of movement of said member, operable to modify said force. The force engendered by movement of the shoes by the rotating member is in fact dependent on the coefficient of friction of the lining on the disc, the connection being such that the resulting tangential force is characterised, in comparison with the conventional disc brake, by a greatly enhanced stability when the coefficient of friction varies, simultaneously combined with a higher efficiency rendering it unnecessary to employ a servo-operated brake. In a preferred construction a disc brake apparatus for vehicles comprises a rotary disc, a frame, a device mounted on said frame and carrying a friction lining and movable tangentially of the disc, means operable by the user to move said device tangentially of the disc against a fluid cushion carried by said frame, a pressure chamber in said frame applying pressure to the device in a direction normal to said friction lining surface, and a communicating conduit between said cushion and said chamber so that an increase in pressure in the cushion due to tangential movement of said device by operation of said means by the user and by said disc moving said device in a direction tangentially of said disc will cause the pressure in said chamber to vary and thereby vary the pressure of said lining on said disc.

Devices may be incorporated which are constructed so that in the case of inopportune locking of one of the wheels of an axle, they cause a partial loosening of the brakes of this axle, thus modifying the distribution of braking power at the very instant at which it proves unsatisfactory, which results in re-establishing adhesion on the ground without appreciable loss of deceleration and even leaving a possible margin for intensification by increasing the force on the control. These devices come into play even more extensively on stopping the vehicle and when the vehicle moves in reverse gear.

A master-cylinder actuated by the user, of conventional construction, may be provided and the fluid cushion is connected to a container by a non-return valve which is powerfully rated, opening in the direction of drainage of the cushion. If this valve is opened (e.g. by stoppage of the wheel, or on reversing the vehicle), the device carrying one of the brake shoes is then no longer held back by the fluid cushion, and brings other devices into action of which the form of operation may be selected to be independent, being a stationary inclined abutment for example.

In another construction, the fluid cushion is connected to an overpressure chamber of the master-cylinder through a valve mounted in a slide which establishes communication between the said cushion and the said overpressure chamber beyond a predetermined pressure within the cushion.

In order that the invention may be more fully understood some embodiments in accordance therewith will now be described by way of example with reference to the accompanying drawings, in which:

FIG. 6 is a cross section of the master-cylinder of the system of FIGS. 3–5;

FIG. 7 shows a detail on a larger scale of the master-cylinder of FIG. 6; and

FIGS. 8 and 9 show in cross section a "freeing" or "unlocking" "station" in FIG. 5 in two positions of operation, respectively.

Figure 1:
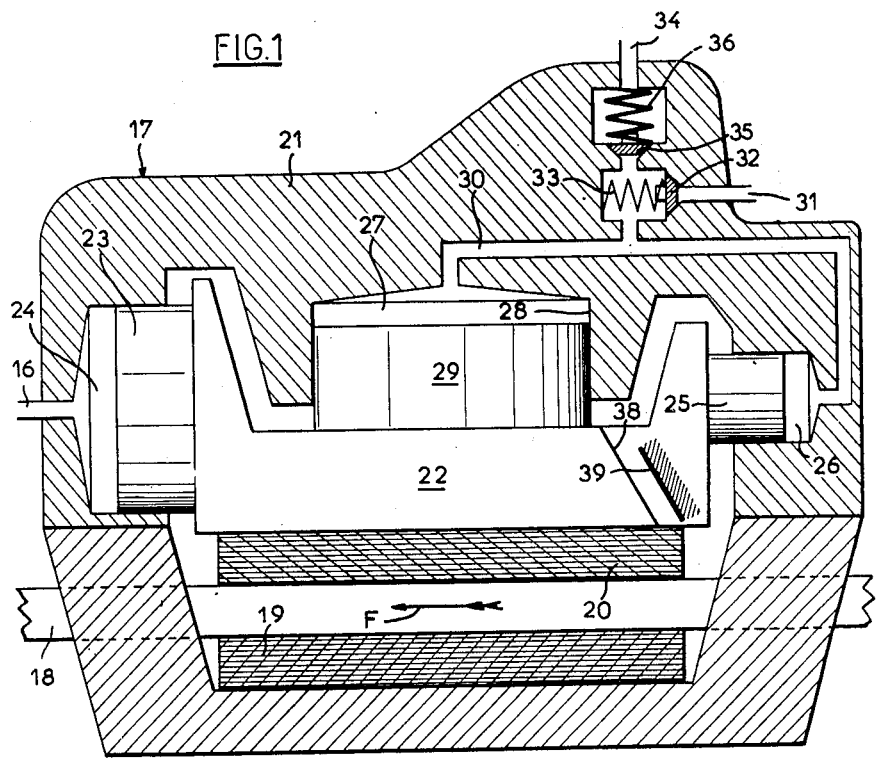
FIG. 1 is a diagrammatic cross section of a disc brake.
Figure 2:
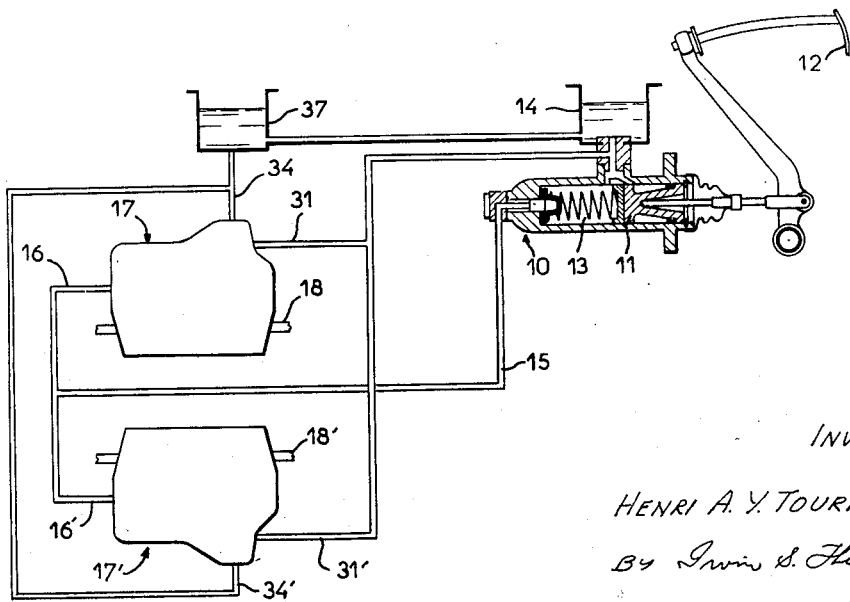
FIG. 2 is a hydraulic diagram of a braking system for an automotive vehicle having two disc brakes.

Referring to FIGS. 1 and 2 these show a braking apparatus for braking an automotive vehicle. The master-cylinder 10 of conventional construction, operates on a substantially incompressible fluid such as oil, and comprises (FIG. 2) a piston 11 actuated by a pedal 12 to discharge the oil into a chamber 13 which is filled in the idle condition from a container 14. The chamber 13 is connected through conduits 15 and 16, 16' to disc brakes 17, 17' of the wheels of an axle of the vehicle.

Each brake 17, 17' comprises a rotary disc 18, 18' fast in rotation with the corresponding wheel and displaced in the direction of the arrow F in forward motion.

The disc 18 (FIG. 1) is gripped in operation between two shoes, having friction facings or linings 19 and 20, along a resultant direction at right angles to their friction surfaces. The brake as shown comprises a stationary frame 21 supporting the lining 19, whereas the lining 20 is supported by a head 22, the whole forming a unit mounted for tangenital displacement with respect to the wheel 18.

The head 22 engages at one end a piston 23 which is mounted in tangentially displaceable manner within a cylinder 24 connected to the conduit 16. At the other end, it engages a piston 25 mounted in tangentially displaceable manner within a cylinder 26 forming a cushion of oil.

A clamping chamber 27 is associated with the head 22 and is bounded by a cylinder 28 in the frame 21 and by a piston 29 which is displaceably mounted in the cylinder 28 in a direction at right angles to the friction surfaces of linings 19, 20 and is applied against the head 22, in such manner that the pressure within the chamber 27 effects the gripping of the disc 18 between the linings 19 and 20.

A communication conduit 30 is provided in the frame 21 between the cushion 26 and the clamping chamber 27. The chambers 26, 27 and the conduit 30 form an enclosure which is connected to a conduit 31 through a non-return valve 32 which opens in the direction from 31 into 30 against the action of a light spring 33. The conduits 31 and 31' are connected to a container 14 of the master-cylinder 10 in FIG. 2.

The enclosure formed by chambers 26, 27 and the conduit 30 is also connected to a conduit 34 through a non-return valve 35 which opens in the direction 30 into 34 against the action of a powerful spring 36. The conduits 34 and 34' are connected to a container 37 which as shown in FIG. 2 is preferably separate from the container 14 and in communication with the same.

The head 22 has an inclined face 38 which engages a corresponding abutment or bearing face 39 on the frame 21, if the cushion 26 becomes empty by the valve 35 opening.

In forward motion (direction of arrow F in FIG. 1), when the user depresses the pedal 12, the actuating pressure applied in the chamber 24 of each wheel, forces the head 22 in the opposite direction to that of the displacement of the disc 18. This movement establishes a pressure in the cylinder 26 and the conduit 30, which as soon as the valve 32 closes, is transmitted to the chamber 27 of the piston 29 which causes the disc 18 to be gripped between the linings 19, 20. Once the operating condition has been established, any variation in force tangential to the disc 18 generated by the friction of the elements 19, 20 against the disc 18 results in a variation in the opposite direction to that of reaction on the piston 25, that is to say by a variation in the opposite direction to that of the thrust developed by the piston 29. A self-regulating action is the result thereof.

When the disc 18 is stopped, the pressure increases in 26–30–27, which causes the valve 35 to open. The head 22 then is moved so that its face 38 engages the fixed abutment 39. The angle of inclination of the latter renders it possible to set effectiveness to a desirable ratio relative to that obtained in normal operation.

In reverse motion of the vehicle, the pressure in 26–30–27 becomes very powerful immediately upon application of the linings 19 and 20 in contact with the disc 18, which causes the valve 35 to open. As in the preceding instance, the head 22 is brought to bear against the abutment 39, which assures the braking action. As will be appreciated, this braking action is not balanced, but is acceptable for the reversing motion of an automotive vehicle.

It will be appreciated that the brake which has been described is effective by direct actuation without employing a servo-actuation unit, and is very stable. By selecting the ratio of the cross sectional areas of the pistons 25 and 29 in appropriate manner, it is possible to obtain a brake which combines great stability with high efficiency, unlike conventional brakes. Although the brakes comprising a drum and against which shoes are tightened have this same advantage to a lesser degree owing to constructional requirements, a servo-actuation unit must always be incorporated.

It should be noted that the brake reacts automatically to a loss of wheel adhesion. If during a sudden braking action, the wheel is locked in position, this results in a powerful increase of the pressure in 26–27–30, releasing the operation of the valve 35 and causing operation solely by the action of the pressure at 24 by the abutment of the inclined members 38–39. By appropriately setting the angle of inclination of the latter, it is possible to effect release of the wheel whilst avoiding the serious consequences of a loss of adhesion and at the same time having the benefit of effective braking.

Correction devices, for example a back-pressure limiter, may moreover be combined with the system. They are preferably, and without complicating construction, contrived to be dependent on the pressure 26–27–30. Since this pressure is connected in a two-way manner to the said tangential force, correctors of this kind are dependent on the true couple, and their operation is more precise than that of the correctors of conventional systems dependent on actuating pressure, that is to say which latter make no allowance for the possible variations of the couple at a given pressure.

Reference to FIGS. 3 to 9, these show an analogous construction to that in FIGS. 1 and 2, but which comprises a variant of construction of the brake and its actuation method, in which the size of the brake is reduced whereas any slipping of the parts under forces at right angles to the friction surfaces is prevented.

Figure 3:
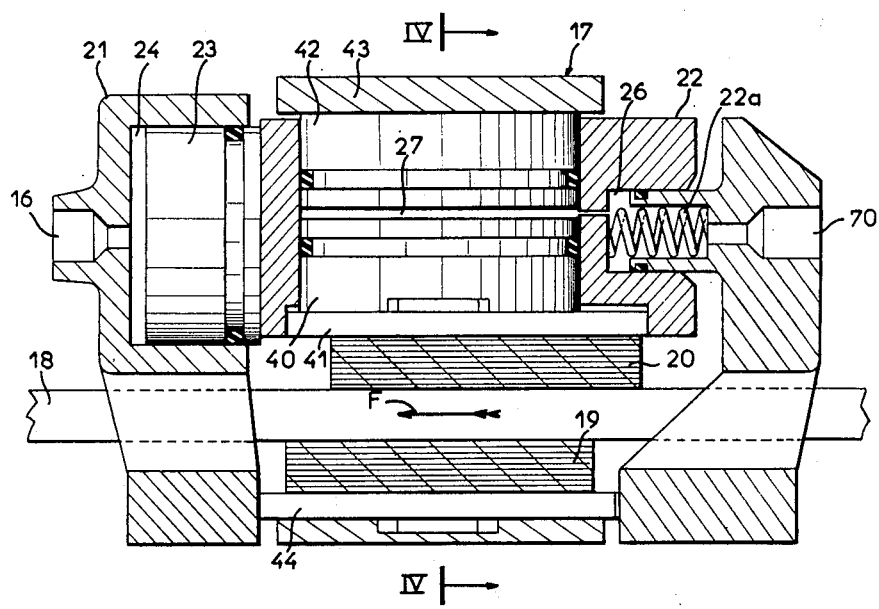
FIG. 3 is a diagrammatic cross section of another disc brake, taken along line III—III of FIG. 4.
Figure 4:
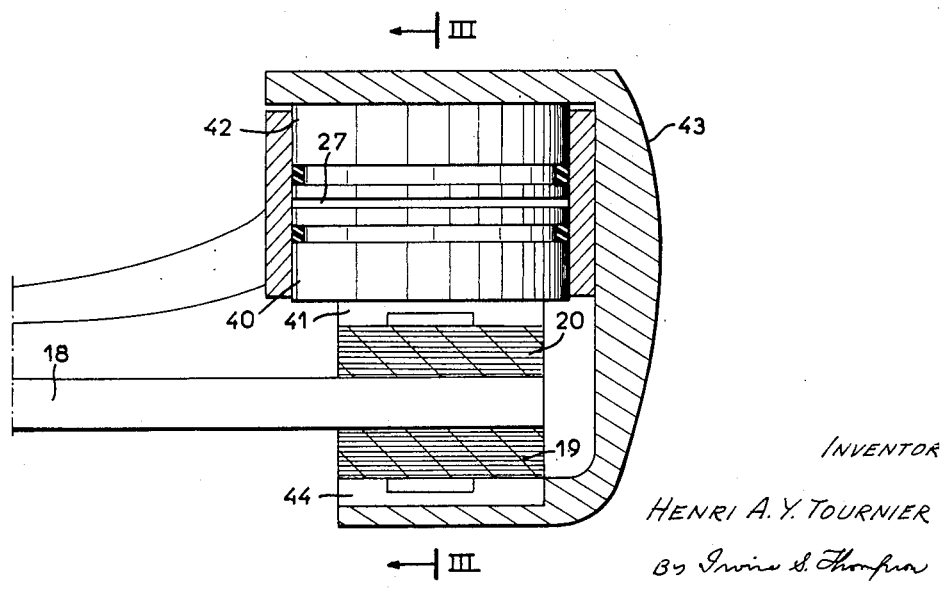
FIG. 4 is a cross section along line IV—IV of FIG. 3.
Figure 5:
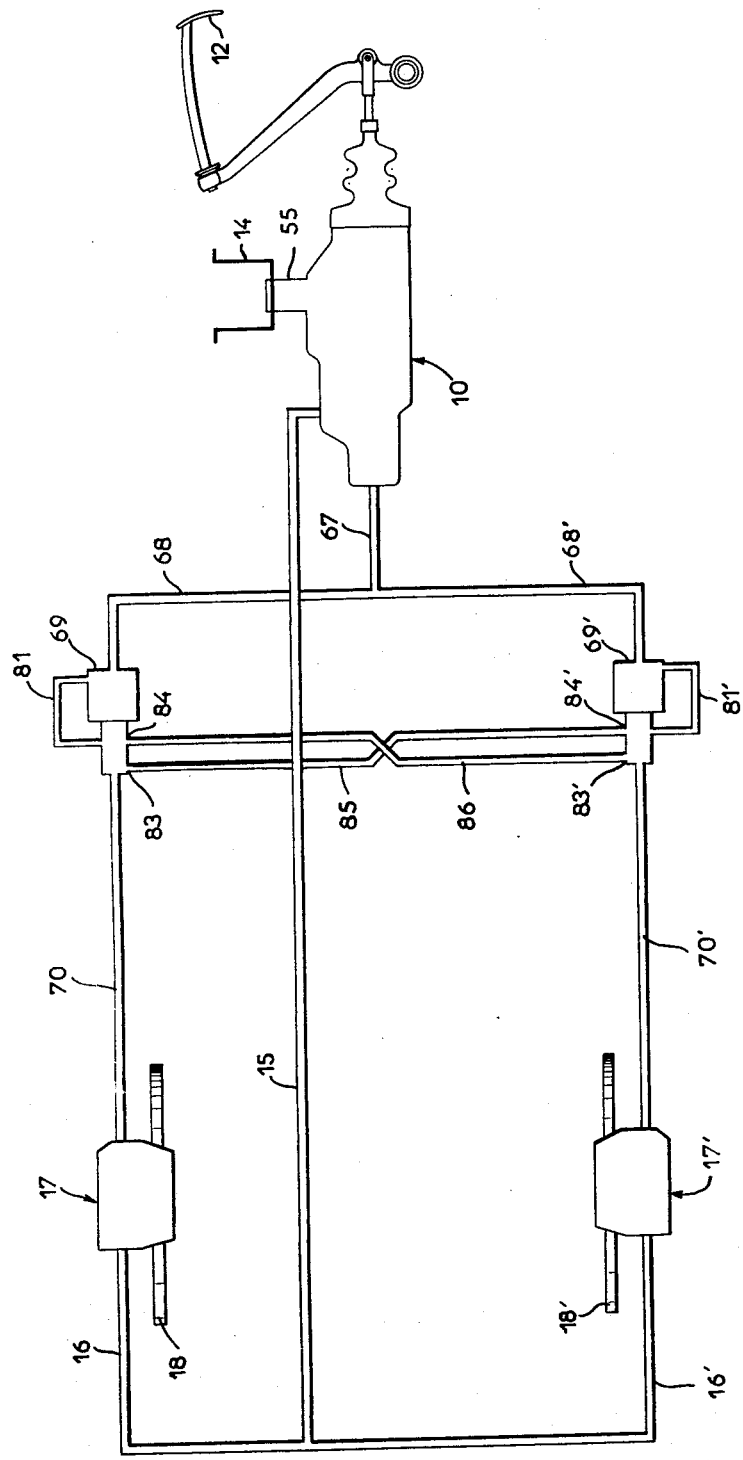
FIG. 5 is a hydraulic diagram of a braking system of an automotive vehicle having two disc brakes constructed as in FIGS. 3 and 4.

FIGS. 3 and 4 show the fixed frame 21 of the disc brake, the displaceable head 22, the actuation piston 23 with the chamber 24 supplied through the conduit 16, the oil cushion 26, the chamber 27, and friction linings 19, 20 co-operating with the disc 18, but in this case the clamping actuation chamber 27 comprises two pistons of which the one 40 engages a small plate 41 carrying the lining 20, whereas the other piston 42 co-operates with a floating yoke or stirrup 43 which engages a small plate 44 carrying the lining 19. In operation, the small plate 41 bears against the head 22 and owing to this fact acts on the regulating device. The small plate 41 and the lining 20 are advantageously offset from the centre with respect to the force supplied by the piston 40 in order to act against the tilting couple due to the other forces borne by the head 22. A spring 22a is interposed between the head 22 and the frame 21 and tends to repel the head 22 in abutment towards the left (FIG. 3) against the frame 21. It will be noted that the small plates 44 and 41 come into abutment during operation, but such abutments may be performed by the linings 19 and 20 themselves, which may moreover project beyond the small plates in order to eliminate noise and may retain an adequate abutment face notwithstanding the degree of wear of the said linings.

The conduits 16 and 16' corresponding to the two brakes of an axle (FIG. 5) are connected to the master-cylinder 10 by the conduit 15. The master-cylinder is constructed as seen in detail in FIG. 6. The conduit 15 is in communication with the main chamber 45 of the master-cylinder through a non-return valve 46 comprising a spring 47 opening in the direction 45–15. The valve 46 (FIG. 7), comprises a residual pressure valve 48 opening in the other direction and loaded by means of a spring 49 which is weaker than the spring 47.

The chamber 45 is formed within the cylinder 10 between two pistons 50 and 51 separated by a spring 52. The piston 50 is operated by the pedal 12 and co-operates with orifices 53 and 54 connected by the conduit 55 to the container 14 for filling in the inoperative position. The piston 51 comprises a shank or stem 56 engaged in a chamber 57 having a smaller diameter than the chamber 45 and containing a spring 58. A conduit 59 connects the chambers 57 and 45 and has an opening 60 in the chamber 57 uncovered or covered by the shank 56 depending on the position of the piston 51.

The piston 50 has longitudinal peripheral passages 61 which co-operate with the liftable lip 62 of a flexible sealing element 63 fast with the said piston, in such manner that fluid may reach the chamber 45 from the passages 61 but is prevented from reaching the passages 61 from the chamber 45. In like manner, the piston 51 and the shank 56 have longitudinal passages 64 which co-operate with a liftable lip 65 of a flexible sealing element 66 fast with the piston 51, in such manner that fluid may reach the chamber 57 from the chamber 45 through the passages 64, but cannot penetrate into the said passages 64 to pass from the chamber 57 to the chamber 45.

The chamber 57 (FIGS. 5 and 6) is connected to a conduit 67 which is joined by two conduits 68 and 68' to two relasing units 69 and 69' respectively. The releasing units 69 and 69' are connected by two conduits 70 and 70' to the fluid cushions 26 and 26' of the two brakes 17 and 17' respectively. The releasing units 69 and 69' which are shown separate from the brakes 17 and 17' may be incorporated in the construction of the latter.

Each releasing unit 69, 69' (FIGS. 8 and 9) comprises a chamber 71 of large diameter, which is connected to the conduit 68, and a chamber 72 of small diameter which is connected to the conduit 70. In the chamber 71 there is a piston 73 comprising a shank 74 slidable in the chamber 72. The piston 73 is mounted to be dispaceable between a first position (FIG. 8) in which it bears against the shoulder 75 separating the chambers 71 and 72, and a second position (FIG. 9) in which it bears against a spring clip 76 or the like, in the chamber 71. The piston 73 is urged into this second position by a spring 77.

The piston 73 and its shank 74 have a central passage 78 to establish communication between the chambers 71 and 72. A valve 79 co-operates with the opening of the passage 78 into the chamber 72 to allow a circulation of the fluid in the direction: passage 78, chamber 72, and to prevent this flow in the opposite direction. The valve 79 is associated with a spring 80 which urges it to the closed position.

A conduit 81 moreover connects the chambers 71 and 72 and has an opening 82 into the chamber 72 which is covered by the shank 74 in the initial position of the piston 73 (FIG. 8), and which is uncovered by the shank 74 in the second position of the piston 73 (FIG. 9).

The chamber 72 also has two other orifices, one 83 which is permanently uncovered, and the other 84 which is disposed in alignment with the opening 82 so that like the latter, it is covered by the shank 74 in the initial position of the piston 73 (FIG. 8) and uncovered by the shank 74 in the second position of the piston 73 (FIG. 9).

The orifice 83 corresponding to the unit 69 is connected (FIG. 5) to the orifice 84' of the other unit 69' through a conduit 85, whereas the orifice 84 of the unit 69 is connected to the orifice 83' of the unit 69' through a conduit 86.

When the user depresses the brake pedal 12, the piston 50 is forced to the left in FIG. 6 and forces the piston 51 to cover the opening 60 of the passage 59. The oil continues to flow through the piston 51 through the passages 64 whilst lifting the lip 65, passes through the conduits 67, 68, 68' while repelling towards the left each slider 73 (FIG. 8), flows through the valves 79, passes through the conduits 70, 70' and reaches the brakes 17, 17' (FIG. 5) through the cushions 26 (FIG. 3), and by acting in the chambers 27, causes the approach stroke of the pistons 73, 74 are selected so that in normal operaas soon as the linings 19 and 20 come into contact with the disc 18. The difference in the cross sectional areas of the pistons 73, 74 are selected so that in ormal operation, the piston 73 is in abutment at 75 (FIG. 8). The piston 51 is immobilised and the pressure rises in the chamber 45 whilst causing the valve 46 to open (FIGS. 6 and 7), which transmits this pressure to the chambers 24 of the brakes 17, 17' through the conduits 15, 16, 16'.

The operation is thereupon analogous to that described with reference to FIGS. 1 and 2.

In the case in which the disc of one of the brakes is stopped, the ratio of the pressures in 72 and 71 exceeds the value for which the piston 73 is in abutment at 75 (FIG. 8) and the piston 73 comes into abutment at 76 (FIG. 9) which uncovers the orifices 82 and 84. In this manner, the chambers 24 of the brakes 17 and 17' are placed in communication with the over-pressure supplied by the piston 51 through the conduits 81 and 81' as well as through the conduits 85 and 86.

Each displaceable head 22 comes into abutment at the right on the fixed frame 21 (FIG. 3) and the operation becomes that of a conventional brake. The ratio between the pressure normally supplied by the master-cylinder, and the overpressure, performs the function of the inclined abutment 38, 39 of FIG. 1, and yields an efficiency which on the average is reduced by a predetermined proportion relative to normal operation, sufficient to ensure the release of a locked wheel, which results from a loss of adhesion, whilst by virtue of the presence of an overpressure remaining pronouncedly greater than that yielded by a conventional disc brake.

When the user releases the pedal 12, each piston 73 is returned into abutment at 76, unless it is already in this position. The oil under pressure escapes through the valve 48 and the brakes are released. The heads 22 return into abutment towards the left (FIG. 3) under the action of the springs 22a.

The fluid cushion 26 may be replaced by any other equivalent device associated with a suitable hydraulic, mechanical or electrical device, exerting a force on the clamping shoe which is a multiple of the force exerted on the said device; the brake may comprise any appropriate devices for returning the shoes, for taking up play or blacklash, or for manual operation, the brake being constructed with fixed or floating yokes or stirrups. The device according to the invention may be modified so that the friction surface grips a drum instead of a flat disc.

I claim:

A disc brake apparatus for vehicles comprising a rotary disc, a frame, a device mounted on said frame and carrying a friction lining and movable tangentially of the disc, means operable by the user to move said device tangentially of the disc against a fluid cushion carried by said frame, a pressure chamber in said frame applying pressure to the device in a direction normal to said friction lining surface, and a communicating conduit between said cushion and said chamber so that an increase in pressure in the cushion due to tangential movement of said device by operation of said means by the user and by said disc moving said device in a direction tangentially of said disc will cause the pressure in said chamber to vary and thereby vary the pressure of said lining on said disc, the said chamber and said cushion being connected to an overpressure chamber, associated with a master-cylinder actuated by the user, and connected to the over-pressure chamber through a non-return valve opening to permit fluid flow from the overpressure chamber, said valve being mounted in a slide operable to place said cushion and said pressure chamber in communication with said overpressure chamber when the pressure in said cushion and said chamber reaches a predetermined high pressure compared with the pressure in the overpressure chamber to permit each friction lining to be released from said disc to free the disc.

References Cited by the Examiner

UNITED STATES PATENTS

| | | | |
|---|---|---|---|
| 1,903,973 | 4/1933 | Boughton | 188—152 |
| 2,764,263 | 9/1956 | Bricker | 188—152 |
| 3,047,099 | 7/1962 | Dahle | 188—196 X |
| 3,100,553 | 8/1963 | Butler | 188—152 X |
| 3,137,370 | 6/1964 | Lepelletier | 188—152 |
| 3,173,517 | 3/1965 | Powlas | 188—152 |

MILTON BUCHLER, *Primary Examiner.*

G. E. A. HALVOSA, *Assistant Examiner.*